US009689731B2

(12) United States Patent
Bulteau et al.

(10) Patent No.: US 9,689,731 B2
(45) Date of Patent: Jun. 27, 2017

(54) FLUID METERS

(71) Applicant: ITRON FRANCE, Issy-les-Moulineaux (FR)

(72) Inventors: Serge Bulteau, Issy-les-Moulineaux (FR); Michel Bottner, Issy-les-Moulineaux (FR); Sebastien Schwenter, Issy-les-Moulineaux (FR); Anthony Renoud, Issy-les-Moulineaux (FR)

(73) Assignee: Itron Global SARL, Liberty Lake, WA (US)

(*) Notice: Subject to any disclaimer, the term of this patent is extended or adjusted under 35 U.S.C. 154(b) by 218 days.

(21) Appl. No.: 14/285,215

(22) Filed: May 22, 2014

(65) Prior Publication Data

US 2014/0251002 A1 Sep. 11, 2014

Related U.S. Application Data

(63) Continuation of application No. PCT/EP2012/073528, filed on Nov. 23, 2012.

(30) Foreign Application Priority Data

Nov. 24, 2011 (EP) .................................. 11306554

(51) Int. Cl.
*G01F 1/00* (2006.01)
*G01F 15/06* (2006.01)
(Continued)

(52) U.S. Cl.
CPC ............ *G01F 15/068* (2013.01); *G01F 15/00* (2013.01); *G01F 15/061* (2013.01); *G01F 15/14* (2013.01);
(Continued)

(58) Field of Classification Search
CPC .... G01F 15/14; G01F 15/068; G01F 15/0755; G01F 15/063; G01F 15/061; G01D 11/26; G05B 2219/23128; G05B 2219/23178
(Continued)

(56) References Cited

U.S. PATENT DOCUMENTS 5,867,140 A * 2/1999 Rader .................... G09G 5/363
345/100
6,611,769 B2 8/2003 Olson
(Continued)

OTHER PUBLICATIONS

European Patent Office, European Search Report issued in connection with European Application No. 11306554.4, dated Feb. 24, 2012, 5 pages.
(Continued)

*Primary Examiner* — Jonathan Dunlap
(74) *Attorney, Agent, or Firm* — Hanley, Flight & Zimmerman, LLC

(57) ABSTRACT

Meters are described. In one example, a meter includes a totalizer including an electronic circuit and a metering screen, a cap at least partially covering the totalizer, the cap including a window to facilitate viewing of data of the metering screen, and a screen cover mounted on the cap and movable between an open position and a closed position in order to cover the metering screen. In such an arrangement the electronic circuit includes a device for detection of the open position or the closed position of the screen cover, and the detection of the open position or the closed position controls scrolling of data of the metering screen.

21 Claims, 3 Drawing Sheets

(51) Int. Cl.
*G01F 15/00* (2006.01)
*G01F 15/14* (2006.01)
*G01D 11/26* (2006.01)

(52) U.S. Cl.
CPC .... *G01D 11/26* (2013.01); *G05B 2219/23128* (2013.01); *G05B 2219/23178* (2013.01)

(58) Field of Classification Search
USPC .......... 345/214, 156, 204, 205; 702/45, 100; 73/198, 861, 195
See application file for complete search history.

(56) References Cited

U.S. PATENT DOCUMENTS

| | | | | |
|---|---|---|---|---|
| 8,212,769 B2* | 7/2012 | Kitami | ................ | G01F 15/068 345/156 |
| 8,482,908 B2* | 7/2013 | Schwartz | ............... | H05K 5/062 324/74 |
| 8,931,337 B2* | 1/2015 | Renoud | ................ | G01F 15/063 73/198 |
| 8,933,887 B2* | 1/2015 | Umemoto | .......... | G05B 19/0428 345/167 |
| 2003/0028333 A1 | 2/2003 | Olson | | |
| 2009/0115689 A1 | 5/2009 | Mitsutake | | |
| 2009/0167732 A1* | 7/2009 | Kitami | ................ | G01F 15/068 345/205 |
| 2012/0050156 A1* | 3/2012 | Umemoto | .......... | G05B 19/0428 345/156 |
| 2012/0298536 A1* | 11/2012 | Rauta | ................... | H04B 1/3888 206/301 |
| 2013/0328825 A1* | 12/2013 | Brown | ..................... | G06F 3/01 345/174 |

OTHER PUBLICATIONS

International Searching Authority, International Search Report and the Written Opinion issued in connection with International Application No. PCT/EP2012/073528, dated Apr. 2, 2013, 10 pages.

* cited by examiner

FLUID METERS

CROSS-REFERENCE TO RELATED APPLICATIONS

This application is a continuation of International Patent Application No. PCT/EP2012/073528, filed Nov. 23, 2012, which claims priority to European Patent Application No. EP 11306554.4, filed Nov. 24, 2011. International Patent Application No. PCT/EP2012/073528 and European Patent Application No. EP 11306554.4 are both incorporated herein in their entirety.

FIELD OF THE DISCLOSURE

This disclosure relates generally to meters and, more particularly, to fluid meters that may be used, in particular, for water.

BACKGROUND

Conventionally, a fluid meter, in particular for water, includes a reservoir provided with an inlet duct and an outlet duct for water and contains a measurement chamber. The measurement chamber may be a turbine measurement chamber, an oscillating piston measurement chamber, or a static measurement chamber, such as, for example, an ultrasonic measurement chamber. A totalizer, which makes it possible to determine the flow rate or the volume of water passing through the reservoir, is mounted and connected on this reservoir. Such a totalizer includes various electrical, mechanical, and electronic elements and is contained in a cover, generally made from plastic material, which ensures that it is retained and which includes a window for viewing a metering screen, generally a liquid crystal display.

This cover in turn is covered with a cap that bears markings specific to the meter, ensures tamper-proof operation, and has an external window for viewing the screen. A screen cover can be mounted on the cap in order to cover and protect this screen from ultra-violet rays and to prevent the introduction of external elements such as mud or dust through the external window.

Some known approaches equip such a meter with a push button that is accessible from the exterior and passes through the cap. This push button is connected to an electronic card bearing the metering screen. This push button ensures the scrolling and the selection of various data on this screen, such as the volume, the flow rate, the temperature, alarms, the number of leaks, etc.

Passing through the cap and all the elements disposed between this cap and the electronic card, the presence of this push button poses a problem of sealing against water and dust. This arrangement is particularly problematic when the meter is intended to be installed in an environment capable of being flooded, because the electronic card must be situated in a totally leak-proof compartment

Various aspects of the disclosure are described below in greater detail with the aid of drawings, which show a preferred embodiment. Other implementations are possible.

DETAILED DESCRIPTION

The embodiments shown and described herein solve various problems by proposing an arrangement for scrolling data on the metering screen that avoids any passage through the cap.

According to one example, a fluid meter, in one particular example, for water, includes a totalizer having an upper electronic card having a metering screen, this totalizer being covered by a cap having an external window for viewing of the screen, a screen cover being mounted on the cap in order to cover and protect the screen and the external window. The electronic card of the meter is provided with a device for detection of the open or closed position of the screen cover. This detection of the open or closed position controls scrolling of the data of the screen.

According to a preferred embodiment, the detection device may be a Hall Effect sensor and the screen cover may be provided with a magnet. The magnet may be advantageously disposed on the surface of the screen cover facing the card. The magnet may be preferably over-molded on the surface. Advantageously, the magnet may be over-molded in an extra thickness of the viewing cover, in such a way as to come into a closed position near to a transparent panel covering the electronic card.

Figure 1:
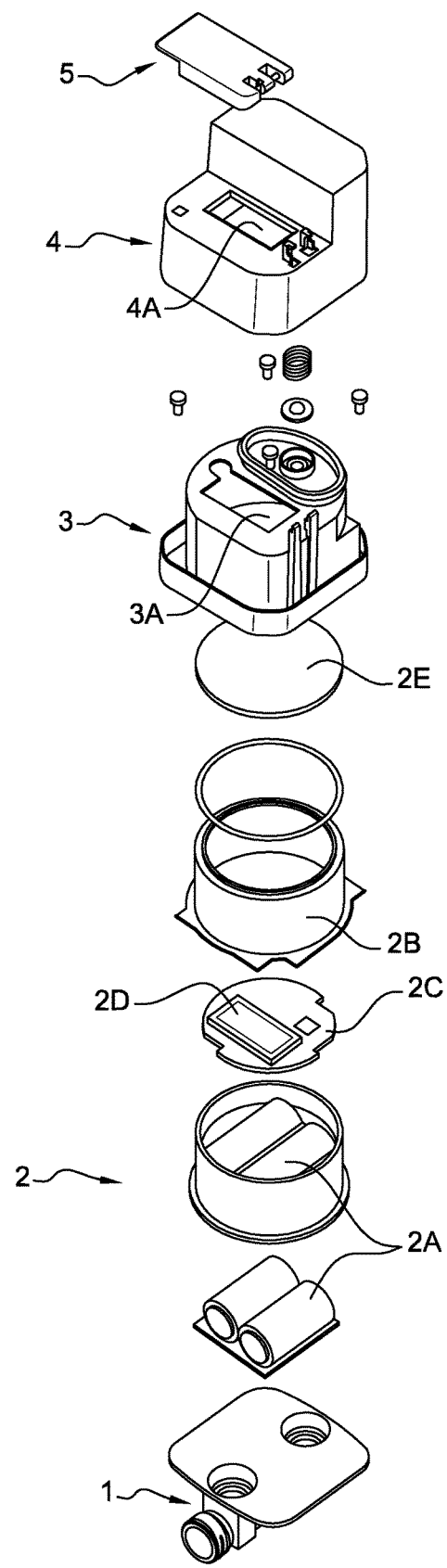
FIG. 1 shows an exploded perspective view of a meter according to the disclosure.

As shown in the example of FIG. 1, a fluid meter, in one particular example for water, includes a reservoir 1 provided with an inlet duct and an outlet duct for water and contains a measurement chamber, which may be a turbine measurement chamber, an oscillating piston measurement chamber or a static measurement chamber, for example an ultrasonic measurement chamber. A totalizer 2, which makes it possible to determine the flow rate or the volume of water passing through the reservoir 1, is mounted and connected on this reservoir 1. The example totalizer 2 includes various electrical, mechanical and electronic elements 2A and is contained in a housing 2B, made for example from metal, and includes an upper electronic card 2C including a metering screen 2D covered by a transparent panel 2E made from plastic material or glass.

The example totalizer 2 is covered by a cover 3, generally made from plastic material, which ensures that it is retained and which includes a window 3A for viewing the screen 2D.

The cover 3, in turn, is covered with a cap 4 that may bear markings specific to the meter, ensure tamper-proof operation. The cap 4 also has an external window 4A for viewing the screen 2D. The cover 3 may contain a remote meter reading antenna as shown in FIG. 1.

A screen cover 5 is mounted on the cap 4 in order to cover and protect this screen from ultra-violet rays and to protect this external window 4A in order to prevent the introduction of external elements such as mud or dust.

Figure 2:
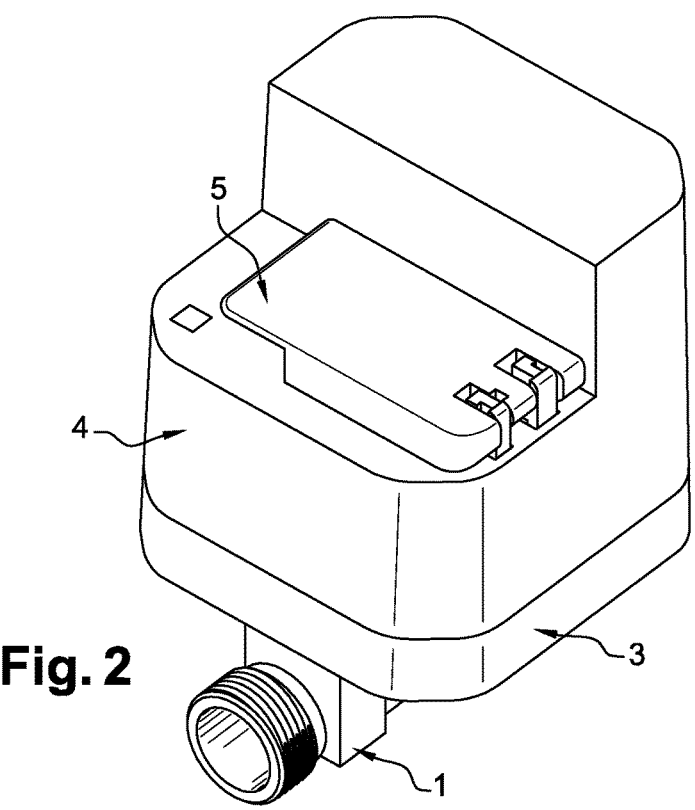
FIG. 2 shows a sectional perspective view of a meter according to the disclosure, the screen cover being in a closed position.

FIG. 2 shows an example of such a meter with its viewing cover 5 in the closed position.

Figure 3:
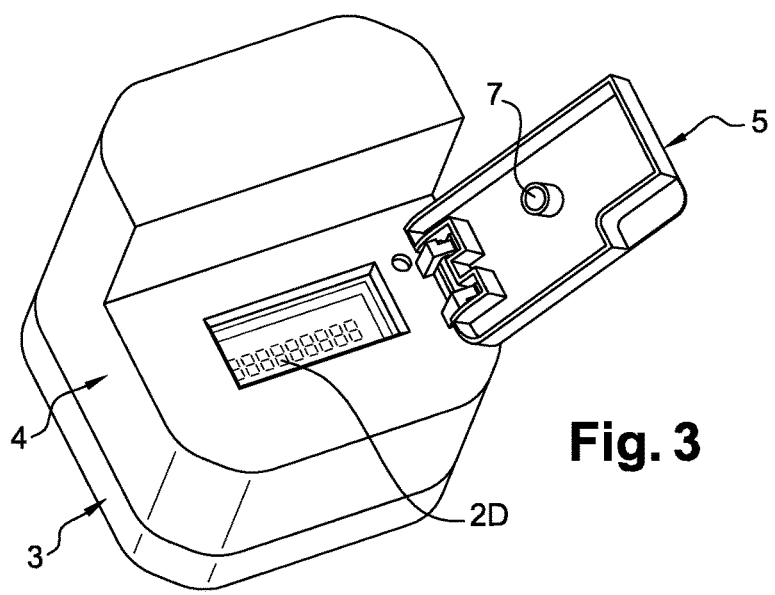
FIG. 3 shows a sectional perspective view of a meter according to the disclosure, the screen cover being in an open position.

FIG. 3 shows an example of such a meter with its viewing cover 5 in the open position leaving the metering screen 2D visible.

As described herein, the electronic card 2C is provided with a device for detection of the open or closed position of the screen cover 5. The detection of this open or closed position controls scrolling of the data on the screen 5.

More precisely, according to one example, in order to consult the metering screen 2D, first of all the viewing cover 5 should be disposed in its open position. In this position a first data item, for example the volume of water consumed, is indicated on the screen and can therefore be consulted.

Other data can be consulted by means of the screen 2D, and these data can scroll on this screen. As described herein, in order to consult the second data item, the viewing cover 5 is again disposed in its closed position and the detection of this closed position controls scrolling of the data on the screen 2D, and more precisely the indication of a second data item.

Likewise, by successive closures of the viewing cover 5, the various data scroll and can be indicated and consulted on the screen 2D.

Of course this scrolling can be controlled both by the detection of the closed position and by the detection of the open position of the viewing cover 5.

Figure 4:
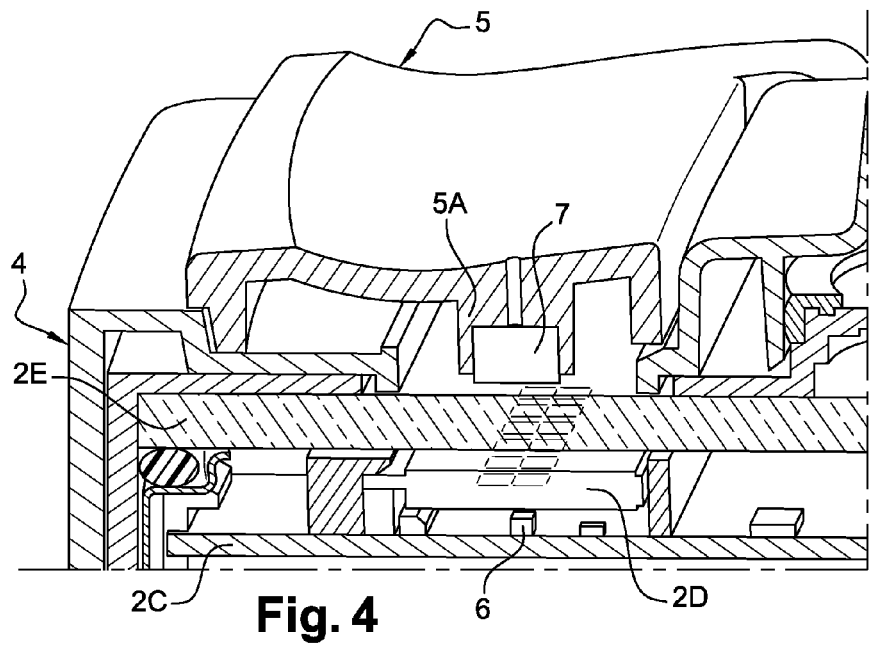
FIGS. 4 and 5 show sectional partial views of a meter according to the disclosure, the screen cover being in a closed position and in an open position, respectively.
Figure 5:
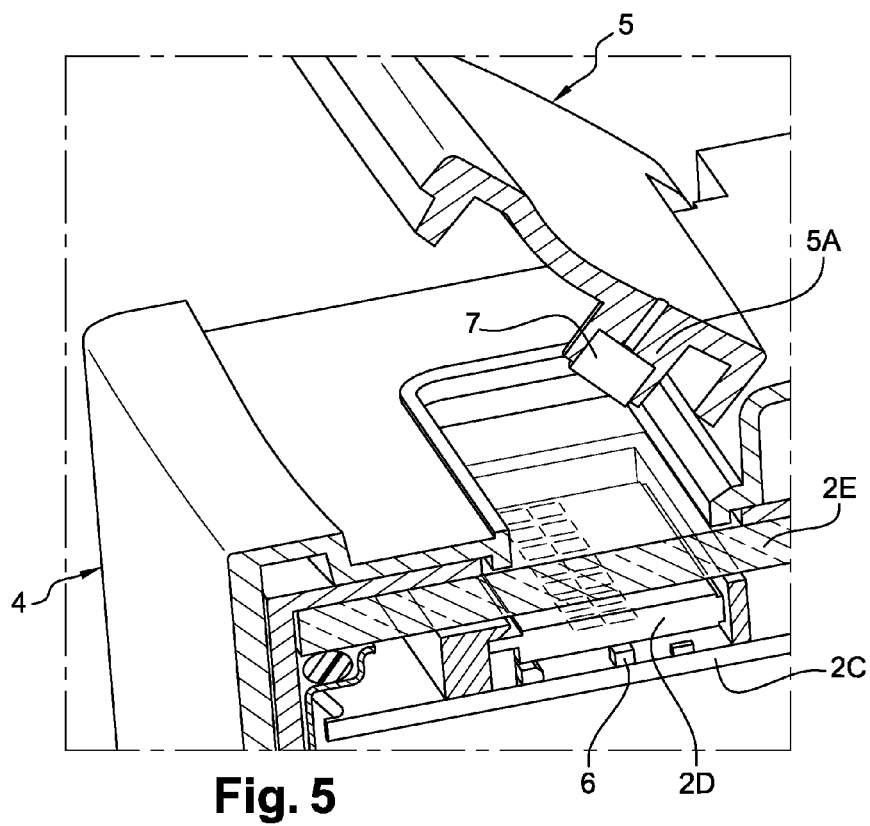

According to a presently preferred embodiment shown in FIGS. 4 and 5, the detection device borne by the electronic card 2C may be a Hall Effect sensor 6 and the screen cover 5 may be provided with a magnet 7 advantageously disposed on the surface of the screen cover 5 facing the electronic card 2C. The magnet 7 may be preferably over-molded on this surface.

For better detection, according to one example, the magnet is over-molded in an extra thickness of the viewing cover, in such a way as to come into a closed position near to the transparent panel covering the electronic card 2C and disposed below the external window for viewing the screen 2D. The magnet 7 is then facing the Hall Effect sensor 6.

What is claimed is:

1. A meter comprising:
    a totalizer comprising an electronic circuit and a metering screen;
    a cap at least partially covering the totalizer, the cap comprising a window to facilitate viewing of data of the metering screen; and
    a screen cover being mounted on the cap and movable between an open position and a closed position in order to cover the metering screen, wherein the electronic circuit comprises a sensor to detect a magnet for determination of the open position or the closed position of the screen cover, and wherein the determination of the open position or the closed position controls scrolling of data of the metering screen, wherein determination of a number of successive closures of the screen cover defines a context to select a parameter corresponding to the number of successive closures, the parameter to be displayed on the metering screen, and wherein the magnet is over-molded into a protrusion of the screen cover that extends from an inner surface of the screen cover.

2. The meter of claim 1, wherein the sensor includes a Hall Effect sensor.

3. The meter of claim 2, wherein the Hall Effect sensor is disposed in a region that prevents intrusion of external elements.

4. The meter of claim 1, wherein the magnet is disposed on a distal surface of the protrusion facing the electronic circuit.

5. The meter of claim 1, wherein the magnet is over-molded into the protrusion in such a way as to come near to a transparent panel covering the electronic circuit when the screen cover is in the closed position.

6. The meter of claim 1, wherein the protrusion of the screen cover faces the metering screen when the screen cover is in the closed position.

7. The meter of claim 1, further including a recess proximate or defined by the metering screen, the recess to receive the protrusion when the screen cover is in the closed position.

8. The meter of claim 7, wherein the sensor is disposed within a substantially sealed housing of the meter and on a side of the metering screen that is opposite from the screen cover.

9. The meter of claim 7, wherein a perimeter of the recess surrounds an outer perimeter of the screen cover.

10. The meter of claim 1, wherein the screen cover is hinged.

11. The meter of claim 1, wherein the protrusion is substantially round, the protrusion having a central bore in which the magnet is at least partially disposed.

12. The meter of claim 1, further including a perimeter protrusion of the screen cover that defines a gap between the metering screen and the magnet when the screen cover is in the closed position.

13. The meter of claim 12, wherein a perimeter of the perimeter protrusion follows an outer perimeter of the screen cover.

14. A meter comprising:
    electronics including a sensor and a metering screen; and
    a screen cover movable between an open position and a closed position in order to cover the metering screen, wherein the sensor detects a magnet to determine whether the screen cover is in the open position or the closed position, and wherein the determination of the open position or the closed position controls scrolling of data of the metering screen, wherein determination of a number of successive closures of the screen cover defines a context to select a parameter corresponding to the number of successive closures, the parameter to be displayed on the metering screen, wherein the magnet is over-molded into a protrusion of the screen cover, the protrusion extending from an inner surface of the screen cover.

15. The meter of claim 14, wherein the sensor includes a Hall Effect sensor.

16. The meter of claim 14, wherein the magnet is disposed on a distal surface of the protrusion facing the electronics.

17. The meter of claim 14, wherein the magnet is over-molded in the protrusion in such a way as to come substantially close to a transparent panel covering the electronics when the screen cover is in the closed position.

18. A method for use in a meter, the method comprising:
    displaying a first data item on a metering screen;
    determining, via detection of a magnet by a sensor, that a screen cover associated with the metering screen has changed position between an opened position in which the metering screen is visible and a closed position in which the metering screen is not visible, wherein the magnet is over-molded into a protrusion of the screen cover, the protrusion extending from an inner surface of the screen cover;
    selecting a second data item based on a number of successive closures of the screen cover, wherein the number of successive closures defines a context to select a parameter to be displayed as the second data item; and
    displaying the second data item on the metering screen in response to detecting that the screen cover over the metering screen has changed position.

19. The method of claim 18, wherein the sensor includes a Hall Effect sensor.

20. The method of claim 18, wherein displaying the second data item is performed in response to detecting that the screen cover has changed from the opened position to the closed position.

21. The method of claim 18, wherein the first data item comprises an indication of a volume of water consumed and the second data item comprises another indication.

* * * * *